(12) United States Patent  
Shi et al.

(10) Patent No.: US 9,024,804 B2  
(45) Date of Patent: May 5, 2015

(54) PARTIAL COVERING RADOME FOR A RADAR UNIT

(75) Inventors: Shawn Shi, Thousand Oaks, CA (US); David Jay Vess, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 160 days.

(21) Appl. No.: 13/617,883

(22) Filed: Sep. 14, 2012

(65) Prior Publication Data

US 2014/0159942 A1    Jun. 12, 2014

(51) Int. Cl.
| | |
|---|---|
| *G01S 13/86* | (2006.01) |
| *G01S 7/02* | (2006.01) |
| *H01Q 1/42* | (2006.01) |
| *H01Q 1/12* | (2006.01) |
| *H01Q 1/22* | (2006.01) |
| *H01Q 1/32* | (2006.01) |
| *G01S 13/93* | (2006.01) |
| *G01S 13/00* | (2006.01) |
| *H01Q 1/00* | (2006.01) |

(52) U.S. Cl.
CPC ............... *G01S 13/867* (2013.01); *H01Q 1/42* (2013.01); *G01S 2007/027* (2013.01); *H01Q 1/1271* (2013.01); *H01Q 1/22* (2013.01); *H01Q 1/3266* (2013.01); *H01Q 1/3291* (2013.01); *G01S 2013/9392* (2013.01)

(58) Field of Classification Search
CPC ..... G01S 7/02; G01S 2007/027; G01S 13/86; G01S 13/867; G01S 13/88; G01S 13/93; G01S 13/931; G01S 2013/9371; G01S 2013/9392; H01Q 1/12; H01Q 1/1271; H01Q 1/22; H01Q 1/27; H01Q 1/32; H01Q 1/325; H01Q 1/3266; H01Q 1/3291; H01Q 1/42
USPC .............. 396/7, 12, 89, 103, 419; 318/280; 340/933, 937; 244/3.1–3.19; 342/5, 11, 342/52–55, 61–66, 70–72, 175, 27, 28; 343/872, 873
See application file for complete search history.

(56) References Cited

U.S. PATENT DOCUMENTS

| | | | | |
|---|---|---|---|---|
| 3,165,749 | A | * | 1/1965 | Cushner ........................ 342/53 |
| 3,337,161 | A | * | 8/1967 | Halton ........................ 244/3.14 |
| 3,876,308 | A | * | 4/1975 | Alpers ........................ 244/3.16 |

(Continued)

FOREIGN PATENT DOCUMENTS

| | | | | |
|---|---|---|---|---|
| EP | 1615051 A1 | * | 1/2006 | ............. G01S 17/06 |
| WO | WO2010/121859 A1 | * | 10/2010 | ............. G01S 13/93 |

OTHER PUBLICATIONS

European Search Report dated Aug. 7, 2014.

*Primary Examiner* — Bernarr Gregory  
(74) *Attorney, Agent, or Firm* — Lawrence D. Hazelton

(57) ABSTRACT

A sensor assembly that integrates a camera and a radar sensor is described herein. The sensor assembly includes a housing configured to partially enclose the camera and the radar sensor, and define a partial radome that partially intrudes into the radar beam. The partial radome is configured such that after passing through the partial radome a first phase angle of the first portion of the radar beam differs from a second phase angle of the second portion of the radar beam by an amount substantially corresponding to an integer number of three hundred sixty degrees (360°) of phase angle shift. The partial radome provides glare shield to the camera, protection to assembly, and is configured to minimally effect radar performance.

5 Claims, 4 Drawing Sheets

(56) References Cited

U.S. PATENT DOCUMENTS

| | | | | |
|---|---|---|---|---|
| 4,063,258 A | * | 12/1977 | Allen | 396/419 |
| 4,534,629 A | * | 8/1985 | Bogle et al. | 396/89 |
| 4,601,557 A | * | 7/1986 | Bogle et al. | 396/103 |
| 4,887,080 A | * | 12/1989 | Gross | 340/937 |
| 5,047,776 A | * | 9/1991 | Baller | 342/52 |
| 5,765,043 A | * | 6/1998 | Tyler | 396/12 |
| 6,036,140 A | * | 3/2000 | Tranapp et al. | 244/3.16 |
| 6,771,208 B2 | * | 8/2004 | Lutter et al. | 342/52 |
| 8,217,830 B2 | * | 7/2012 | Lynam | 342/70 |
| 8,330,646 B2 | * | 12/2012 | Baumatz | 342/62 |
| 8,575,527 B2 | * | 11/2013 | Fry | 342/62 |
| 8,604,968 B2 | * | 12/2013 | Alland et al. | 342/70 |
| 2003/0122514 A1 | * | 7/2003 | Mercier et al. | 318/280 |
| 2011/0163904 A1 | | 7/2011 | Alland et al. | |
| 2011/0285576 A1 | | 11/2011 | Lynam | |

* cited by examiner

PARTIAL COVERING RADOME FOR A RADAR UNIT

TECHNICAL FIELD OF INVENTION

This disclosure generally relates to an integrated radar and camera sensor assembly, and more particularly relates to a method and means to form a housing for the sensor assembly that partially obstructs the radar sensor field of view, but does not interfere with the functionality of the radar sensor.

BACKGROUND OF INVENTION

It is known to combine radar sensing and vision sensing to detect objects proximate to a vehicle. An integrated radar and camera system is marketed by Delphi Corporation of Troy, Mich. as the Delphi RACam. Integrating the radar and camera into a single unit is generally advantageous for lowering packaging cost. Such a system is useful to enhance a variety of vehicle safety features such as adaptive cruise control, lane departure warning, forward collision warning, low speed collision mitigation, and autonomous braking for pedestrians and vehicles. The Delphi RACam uses data fusion algorithms to combine inputs from the radar and camera to improve object detection, and thereby reduce the potential for accidents, injury, and costly property damage.

Typically, a radar sensor is protected by a radome that completely covers the radar sensor so that the radar sensor is concealed and/or protected. It is preferable that the radome is uniform across the radar beam, i.e. it is electromagnetically uniform, so that the radar signal is not distorted by the radome. However, since the Delphi RACam locates the camera and radar sensor closely together, a radome that covers the entire radar sensor may obstruct the view of the camera. Furthermore, the camera may require a glare shield to prevent light reflected by the windshield or other vehicle surfaces from causing glare that compromises the camera image. Such a glare shield may partially obstruct the radar beam or radar signal causing undesirable distortion of the radar signal. As such, packaging constraints and aesthetic preferences may promote a housing configuration that causes distortion of the radar signal. In particular, a housing configuration that partially obstructs the radar beam.

SUMMARY OF THE INVENTION

Described herein is a partial radome that partially intrudes into a radar beam from a radar sensor, but is configured so that partial radome does not undesirably distort the radar beam that partially passes through the partial radome.

In accordance with one embodiment, a sensor assembly is provided. The sensor assembly includes a camera, a radar sensor, and a housing. The camera is configured to capture an image based on a light wave received from a camera field of view. The radar sensor is configured to emit a radar beam toward a radar field of view and receive a reflected radar signal from the radar field of view. The radar field of view substantially corresponds to the camera field of view. The housing is configured to enclose partially the camera and the radar sensor. A section of the housing defines a partial radome that partially intrudes into the radar field of view such that a first portion of the radar beam passes through the partial radome and a second portion of the radar beam does not pass through the partial radome.

In one embodiment, the partial radome is configured such that after passing through the partial radome a first phase angle of the first portion of the radar beam differs from a second phase angle of the second portion of the radar beam by an amount substantially corresponding to an integer number of three hundred sixty degrees (360°) of phase angle shift.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
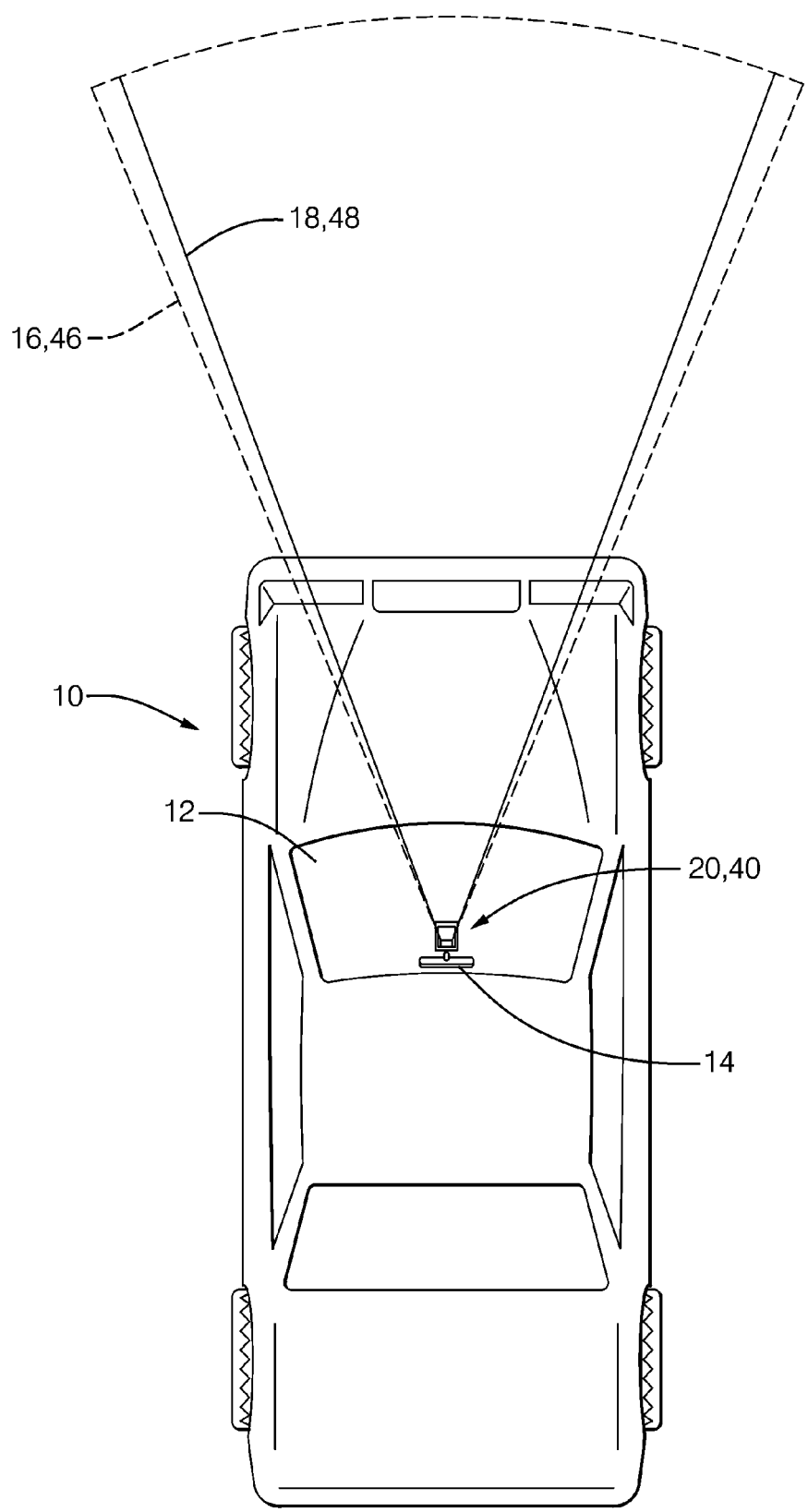
FIG. 1 is a top view of a vehicle equipped with a sensor assembly in accordance with one embodiment.
Figure 4:
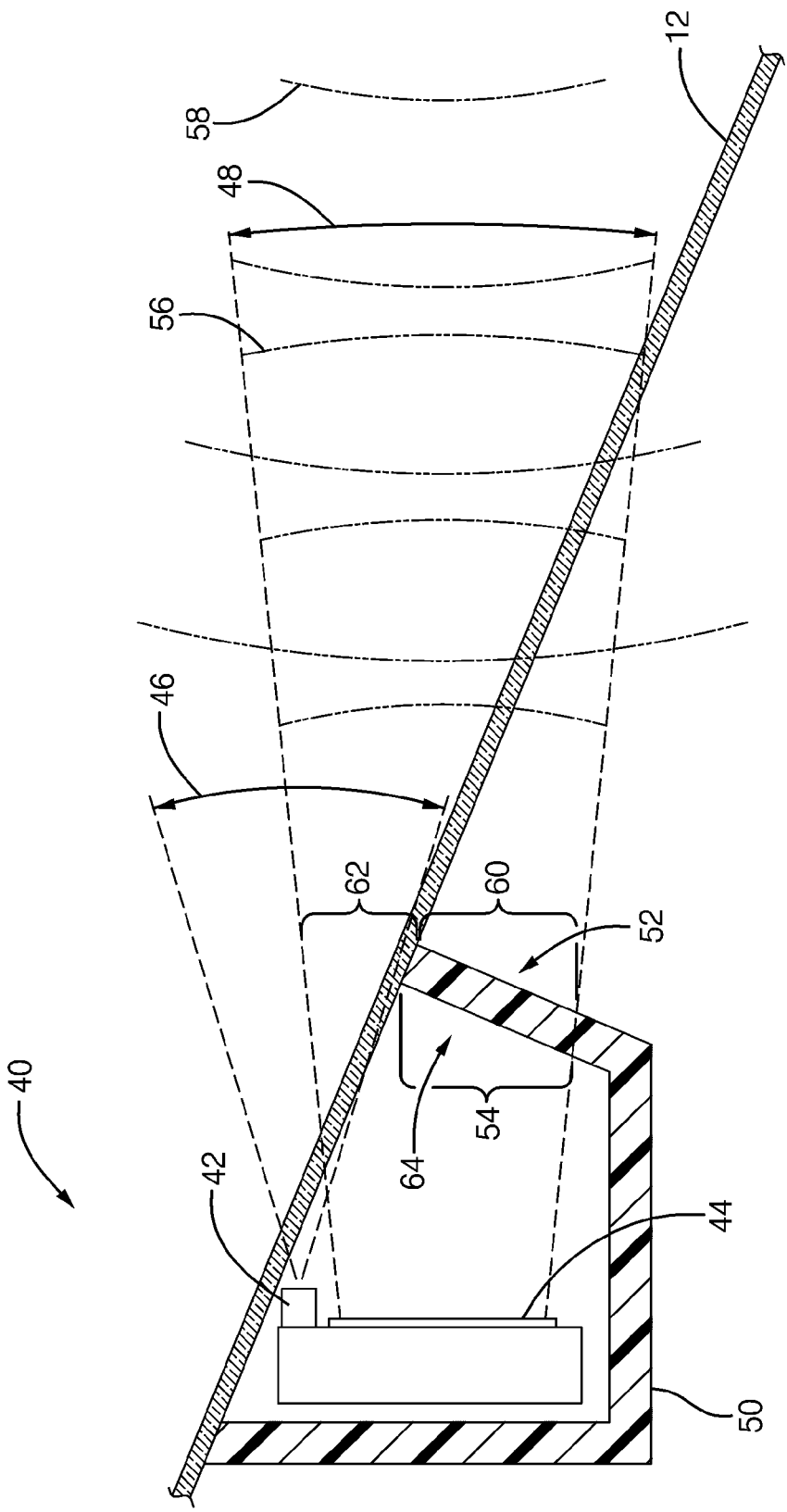
FIG. 4 is a side view of the sensor assembly of FIG. 1 in accordance with one embodiment.

FIG. 1 illustrates a non-limiting example of a vehicle 10 equipped with an assembly comparable to a Delphi RACam marketed by Delphi Corporation of Troy, Mich., hereafter the prior assembly 20 or the sensor assembly 40 (FIG. 4). As will become clear in the description that follows, references to the prior assembly 20 correspond to a sensor module described in United States Published Application Number 2011/0163916 entitled INTEGRATED RADAR-CAMERA SENSOR, published Jul. 7, 2011 by Alland et al., the entire contents of which are hereby incorporated by reference herein. References to the sensor assembly 40 are directed to the invention described herein. The prior assembly 20 and the sensor assembly 40 are suitably located behind a windshield 12 of the vehicle 10, and/or proximate to a rear-view mirror 14. Such a location is advantageous because the location gives the assembly an elevated view of the area forward of the vehicle 10, and generally does not obstruct the field of view of a vehicle operator (not shown) more than the already present obstruction by the rear-view mirror 14.

Figure 2:
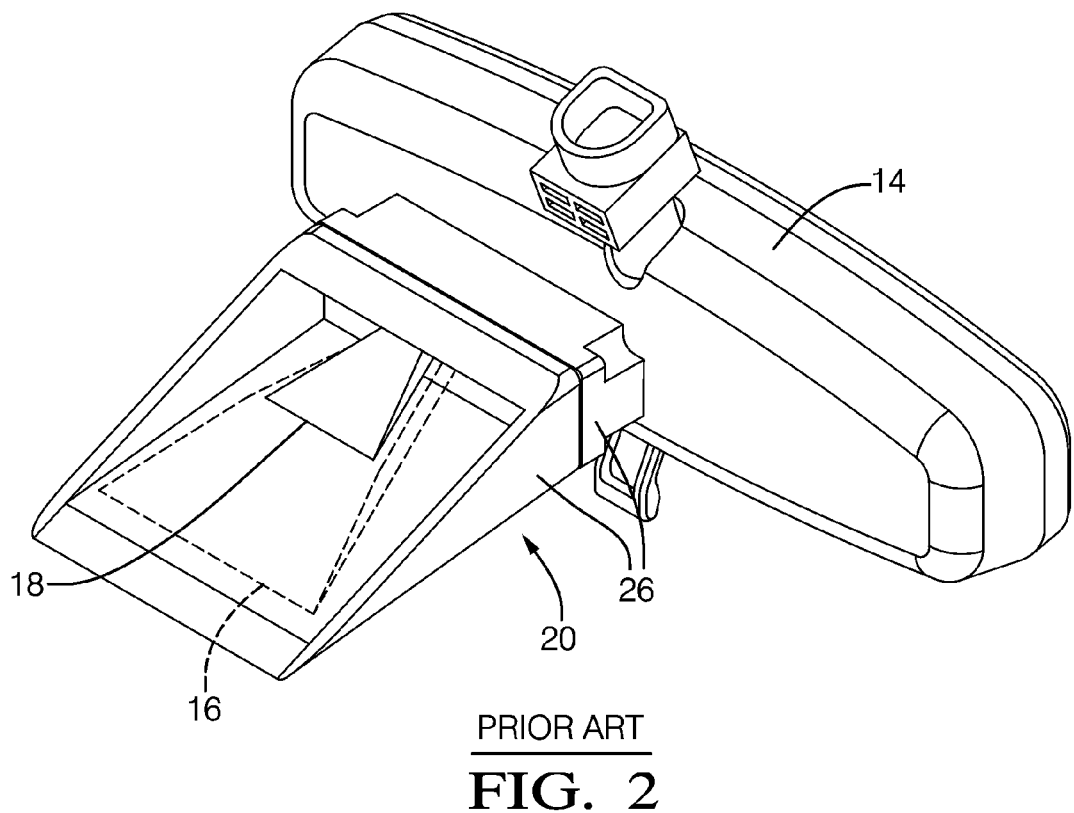
FIG. 2 is a perspective view of the sensor assembly of FIG. 1 in accordance with one embodiment.
Figure 3:
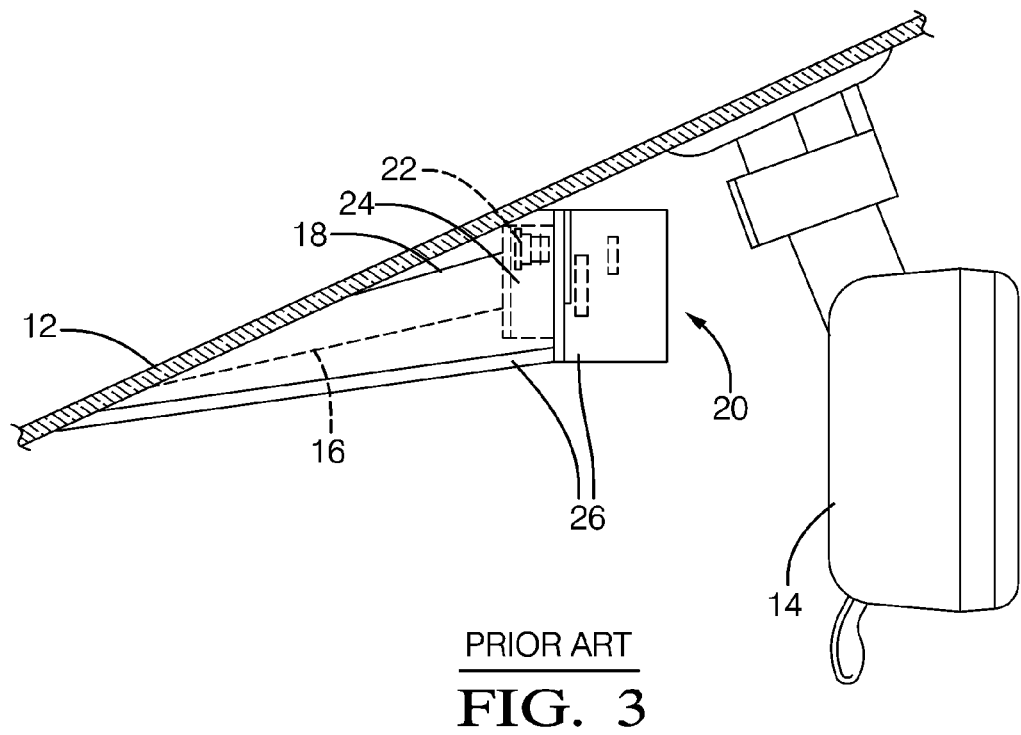
FIG. 3 is a side view of the sensor assembly of FIG. 1 in accordance with one embodiment.

FIGS. 2 and 3 further illustrate details of the prior assembly 20. In general, the prior assembly 20 includes a camera 22 (FIG. 3) and a radar sensor 24. The camera 22 is generally configured to capture an image based on a light wave received from a camera field of view that is depicted by dashed lines extending forward of the vehicle in FIG. 1, and hereafter referred to as the camera field of view 18. The radar sensor 24 is generally configured to emit a radar beam toward a radar field of view that is depicted by solid lines extending forward of the vehicle 10 in FIG. 1, and hereafter referred to as the radar field of view 16. It should be appreciated that the radar sensor 24 is also typically configured to receive a reflected radar signal from the radar field of view 16. As used herein, the characterization that the radar field of view 16 substantially corresponds to or overlaps with the camera field of view 18 means that objects in the travel path of the vehicle 10 would typically be detected by both the camera 22 and the radar sensor 24.

The prior assembly 20 includes one or more parts that cooperate to define or form a housing 26. It should be noted that the housing 26 in the prior art examples does not intrude into, interfere with, or otherwise obstruct the radar field of view 16. The reasons for pointing this out will become clear as features of the sensor assembly 40 are described below.

FIG. 4 illustrates a non-limiting example of a sensor assembly 40. In general, the sensor assembly 40 includes a camera 42 configured to capture an image based on a light wave received from a camera field of view 46. The camera 42 may be any of a variety of commercially available cameras with performance specifications suitable for detecting objects forward of the vehicle 10. The camera 42 may be the same, or similar to, the camera 22. However, the camera 42 is not limited to any particular camera suggested for the prior assembly 20 by any relevant prior art reference. The sensor assembly 40 also generally includes a radar sensor 44 configured to emit a radar beam 56 toward a radar field of view 48, and receive a reflected radar signal 58 from the radar field of view 48. Similar to the camera 42, the radar sensor 44 may be any of a variety of commercially available radar sensors with performance specifications suitable for detecting objects forward of the vehicle 10; and the radar sensor 44 is not limited to any particular radar sensor suggested for the prior assembly 20 by any relevant prior art reference. Preferably, the radar field of view 48 substantially corresponds to the camera field of view 46 so that objects forward of the sensor assembly 40 may be detected by both the camera 42 and the radar sensor 44.

The sensor assembly 40 generally includes a housing 50 configured to partially enclose the camera 42 and the radar sensor 44. The sensor assembly 40 is illustrated as being installed on an interior side of a windshield 12 of the vehicle 10. However, other installation locations are contemplated such as behind the grill of the vehicle or within various trim areas either internal or external to the vehicle. While not specifically illustrated, it is contemplated that the housing 50 may include features such as mounting holes, brackets, or other features known in the art to facilitate attaching the housing to the windshield 12, rear-view mirror 14, or other suitable attachment point on the vehicle 10.

In contrast to the housing 26 of the prior assembly 20, the housing 50 includes a section 52 of the housing 50 that defines a partial radome 54. The partial radome 54 partially intrudes into the radar field of view 48 in order to, for example, satisfy packaging constraints and aesthetic preferences, and/or provide a glare shield for the camera 42. As such, a first portion 60 of the radar beam 56 passes through the partial radome 54, while a second portion 62 of the radar beam 56 does not pass through the partial radome 54. Where the radar beam 56 bypasses the partial radome 54 may also be referred to as a void region. It should be appreciated that the combination of the first portion 60 (i.e. the partial radome 54) and the second portion 62 (i.e. the void region) cooperate to form a radome for the radar sensor 44. As such, even if the second portion 62 is air, the second portion 62 is part of the radome when considered as a whole.

Those skilled in the art of radar sensors will recognize that a partial radome typically would lead to undesirable distortion of the radar beam 56 and the reflected radar signal 58. For example, the expected effect of the partial radome 54 would be that the first portion 60 and the second portion 62 would be out-of-phase with each other, and/or be redirected relative to each other on divergent or crossing paths. However, for aesthetic reasons, and/or reasons of physical protection of the camera 42 and the radar sensor 44, the housing 50 preferably includes features such as the section 52 that results in the partial radome 54 being present in the radar field of view 48.

It was discovered that by suitably selecting materials and dimensions used to form the housing 50 the partial radome 54, a partial radome may be formed that avoids the problem of radar beam distortion described above. By way of example and not limitation, the partial radome 54 may be configured such that after the first portion 60 of the radar beam 56 passes through the partial radome 54, a first phase angle of the first portion 60 of the radar beam 56 can be predictably shifted so that the first phase angle differs from a second phase angle of the second portion 62 of the radar beam 56 by an amount substantially corresponding to an integer number of three hundred sixty degrees) (360°) of phase angle shift. It should be recognized that by shifting the first phase angle an integer multiple of 360° (i.e. $2\pi$ when the units are radians), that the first portion 60 and the second portion 62 will generally be in phase with each other, and so the partial radome 54 can seem to be invisible to the radar beam 56.

It is further contemplated that the partial radome 54 may be formed of more than two layers. Furthermore, even though the partial radome 54 is illustrated as being a single section, multiple sections forming a vertical and/or horizontal array of sections are contemplated. Each section of such an array may be formed of one or more layers of distinct materials in order to provide for more flexibility when designing the housing 50 and thereby provide a housing that meets the aesthetic preferences of vehicle designers.

Given this discovery, some of the housing 50 design constraints are relaxed so that an aesthetically pleasing housing can be designed, and the partial radome 54 can be configured to provide a glare shield 64 for the camera.

Figure 5:
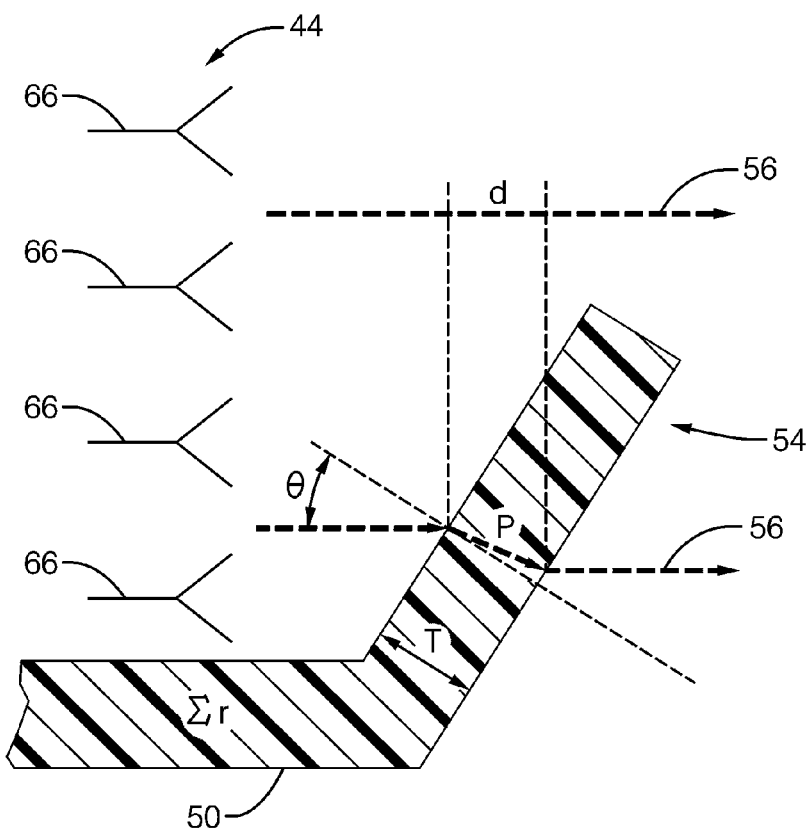
FIG. 5 is a close-up side view of part the sensor assembly of FIG. 4 in accordance with one embodiment.

FIG. 5 illustrates a non-limiting example of how to configure the partial radome 54 to provide the integer multiple of 360° or $2\pi$ phase shift described above. The illustration shows an array of antenna 66 only for the purpose of explanation and not limitation. Those skilled in the art will recognize the antenna 66 as a typical illustration of an antenna array for a radar sensor suitable for detecting objects proximate to the vehicle 10.

It is preferable for the partial radome 54 to be formed of a low loss material for less attenuation, and that the material thickness correspond to an integer multiple of half wavelengths for minimum reflection. As such, a design constraint for the partial radome 54 may be determined using Equation 1 below.

$$T = M * \lambda o / 2 / ((\in r - ((\sin \theta)^2))^0.5) \qquad \text{Eq. 1}$$

Where: M=1, 2, 3, . . . ; $\theta$ is the angle of incidence; $\in r$ is the relative dielectric constant of the material used to form the partial radome 54; and $\lambda o$ is the free space wavelength of the radar beam 56.

In order to minimize the effect of extra phase delay on the first portion 60 relative to the second portion 62 introduced by a partial radome 54, the thickness T of the partial radome 54 is determined using Equation 2 below.

$$T = N * \lambda o * \cos \Phi / (\in r^0.5 - \cos(\theta - \Phi)) \qquad \text{Eq. 2}$$

Where: N=1, 2, 3, . . . ; $\Phi = \arcsin(\sin\theta/(\in r^0.5))$; $\theta$ is the angle of incidence; $\in r$ is the relative dielectric constant of the material used to form the partial radome 54; $\lambda o$ is the free space wavelength of the radar beam 56; and $\lambda g$ is the guided wavelength of the radar beam 56 within radome material. Eq. 1 and Eq. 2 include three variables: T, $\in r$, and $\theta$. One of these variable can be selected to provide a particular design requirement of the partial radome 54 or the housing 50, and then Eq. 1 and 2 can be simultaneously solved to determine preferred values for the other variables. For example, if a particular value of θ is desired, a preferred material thickness (T) and material dielectric constant (∈r) can be calculated for the partial radome 54. P is electrical path length through wall region, d is the corresponding length through void region that bypasses the partial radome 54.

By way of example and not limitation, if the radar frequency is 76.5*10^9 Hertz (76.5 GHz), the angle of incidence is ten degrees (10°), the material selected to form the housing 50 is Bayblend-T65 from Bayer Material Science AG of Leverkusen, Germany that has a relative dielectric constant of 2.73 (∈r=2.73), and N is selected as one (N=1), then a suitable thickness T for the partial radome 54 is 5.96 millimeters (T=5.96 mm). Test results show such a partial radome has little effect on the radar beam 56, i.e. is nearly invisible to the antenna 66. An acceptable effect on the radar beam 56 by the partial radome 54 may be characterized as a 0.5 dB gain drop and a 1 dB sidelobe increase. The partial radome described above was measured to have a 0.3 dB gain drop with a 1 dB sidelobe increase.

Figure 6:
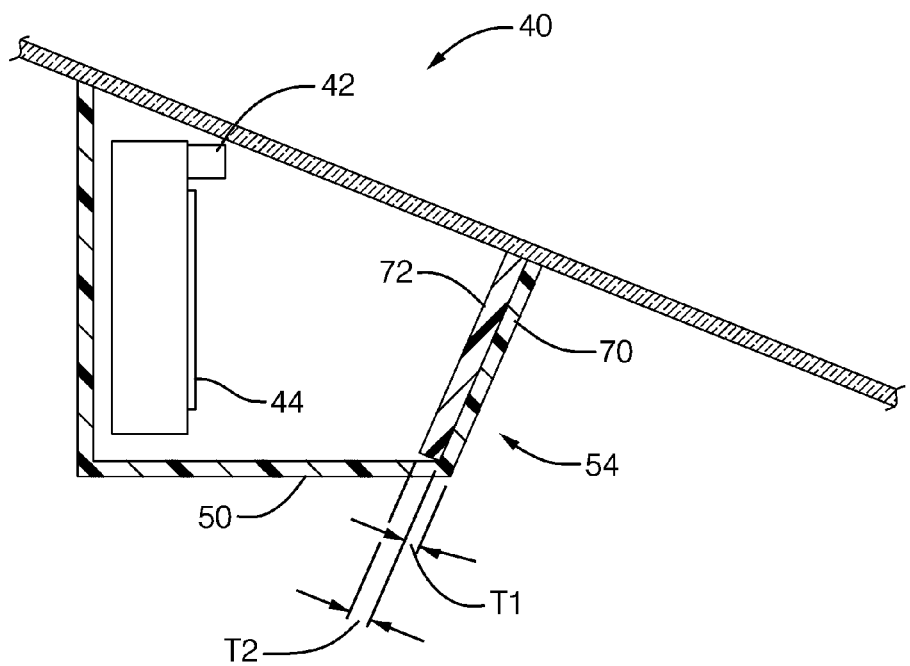
FIG. 6 is a side view of the sensor assembly of FIG. 1 in accordance with one embodiment.

FIG. 6 illustrates another non-limiting example of the housing 50. In the example above, the thickness T is determined to be 5.96 mm. While it is convenient to form the partial radome 54 of the same material used for the housing 50, those skilled in the art of injection molding will recognize that 5.96 mm is thicker than desirable for typical injection molding processes. As an alternative to molding the partial radome 54 as a single contiguous layer as suggested in FIG. 5, the partial radome 54 may be formed of a plurality of layers, for example a first layer 70, and a second layer 72. It is contemplated that that the first layer 70 would be formed of the same material used to form the housing so the exterior of the housing would appear attractive. However, this is not requirement, and forming the first layer 70 and the second layer 72 of materials distinct from the material used to form the housing 50 is contemplated. For example, each of the layers could be formed of distinct materials in order to utilize materials that exhibit lower transmission losses than whatever material is selected to form the housing 50.

It is recognized that it is desirable that the partial radome 54 be configured to minimize reflection of the radar beam 56. A way to minimize reflection is to have the thickness each layer (T1, T2) of the partial radome 54 correspond to one-half wavelength of the guided wavelength of the radar beam 56 within radome material (λg/2). If Bayblend-T65 is used to form the housing 50 and the first layer 70, for example, by way of a single molding operation, then a suitable first layer thickness T1 is T1=2.38 mm by eq. 1 (M=2, λo=3.92 mm, ∈r=2.73, θ=10 deg). Then the second layer 72 could be formed of a material having lower transmission loss than Bayblend-T65 since the second layer 72 is hidden from view and so does not need to have the appearance characteristics of Bayblend-T65. The second layer 72 may be attached to the first layer 70 by way of an adhesive (not shown) between the layers or by way of over-molding the second layer 72 onto the first layer 70 if the materials are suitably compatible for over-molding.

Accordingly, a sensor assembly 40 is provided. The sensor assembly 40 includes a partial radome 54 that generally prevents tampering with the radar sensor 44 and hides it from view. The partial radome 54 may be configured to provide the camera 42 with an unobstructed field of view and provide a glare shield 64 for the camera 42 that blocks light reflections from the vehicle interior and off of the windshield 12. In the prior art, the radome is implemented as a full cover, and the prior art glare shield would require a separate scoop, panel, or triangular shaped shield. This additional glare shield would severely distort the radar wave 56 if the teachings of how to configure the partial radome 54 as described herein were ignored. Packaging the camera 42 and the radar sensor 44 close together is advantageous as they then have a similar perspective view of an area, for example, forward of the vehicle. Furthermore, overall packaging costs are reduced by putting the camera 42 and the radar sensor 44 in the same housing 50

While this invention has been described in terms of the preferred embodiments thereof, it is not intended to be so limited, but rather only to the extent set forth in the claims that follow.

We claim:

1. A sensor assembly comprising:
   a camera configured to capture an image based on a light wave received from a camera field of view;
   a radar sensor configured to emit a radar beam toward a radar field of view and receive a reflected radar signal from the radar field of view, wherein said radar field of view substantially corresponds to the camera field of view; and
   a partial radome configured such that a first portion of the radar beam passes through the partial radome and a second portion of the radar beam bypasses the partial radome.

2. The sensor assembly in accordance with claim 1, wherein the partial radome is configured such that after passing through the partial radome a first phase angle of the first portion of the radar beam differs from a second phase angle of the second portion of the radar beam by an amount substantially corresponding to an integer number of three hundred sixty degrees (360°) of phase angle shift.

3. The sensor assembly as defined in claim 1, wherein the partial radome is further configured to provide a glare shield for the camera.

4. The sensor assembly as defined in claim 1, wherein the partial radome is formed of a plurality of layers of distinct materials.

5. The sensor assembly as defined in claim 1, wherein the partial radome is configured to minimize reflection of the radar beam.

* * * * *